April 9, 1946.  H. B. FREEMAN  2,397,957

FAIRING

Filed Jan. 11, 1943

INVENTOR.
HUGH B. FREEMAN
BY
HIS ATTORNEY

Patented Apr. 9, 1946

2,397,957

UNITED STATES PATENT OFFICE 2,397,957

FAIRING

Hugh B. Freeman, Washington, D. C.

Application January 11, 1943, Serial No. 472,018
3 Claims. (Cl. 114—235)

(Granted under the act of March 3, 1883, as amended April 30, 1928; 370 O. G. 757)

This invention is in fairings, or bodies which reduce the fluid resistance of other bodies. The fairings of my invention are intended particularly for use on flexible cables, and primarily such cables as are towed through the water, but their use is not thus limited.

Marine operations, especially naval operations, include considerable use of the towed cable. Naval vessels, moreover, especially when in waters dangerous because of the possible presence of enemy submarines or other craft, or when engaged in actual battle, must ordinarily move at high speeds.

An ordinary cylindrical cable, however, can not be towed effectively at high speed, and still maintain its desired depth. The water resistance or drag of a cylindrical cable is very large, especially at high speeds, and the lower end of such a cable falls far behind the towing ship and rises toward the surface. At forty knots, for example, an unfaired $\frac{7}{16}$-inch cable, with a tension of four thousand pounds, must be roughly three hundred feet in length in order to reach a depth of sixty feet. It is apparent that such a length of cable is not only unwieldy in high speed action, but that the power required to tow it becomes very great. With the use of my invention, a cable one-fourth as long, with a similar tension, will reach the same or greater depth. The resistance of the faired cable is only five to ten per cent of the resistance of an unfaired cylindrical cable.

One of the objects of this invention is to provide a fairing for a cylindrical cable which will reduce the fluid resistance of the cable.

Another object of this invention is to provide a fairing for a cable that will quickly respond to changes in direction of the cable.

A further object is to provide a fairing which will not be substantially affected by the natural and changeable curvature of a towed cable.

It is still further desired to provide a fairing that may be readily attached to and removed from a cable.

Other objects will appear from a reading of the following specification and claims.

Figure 1:
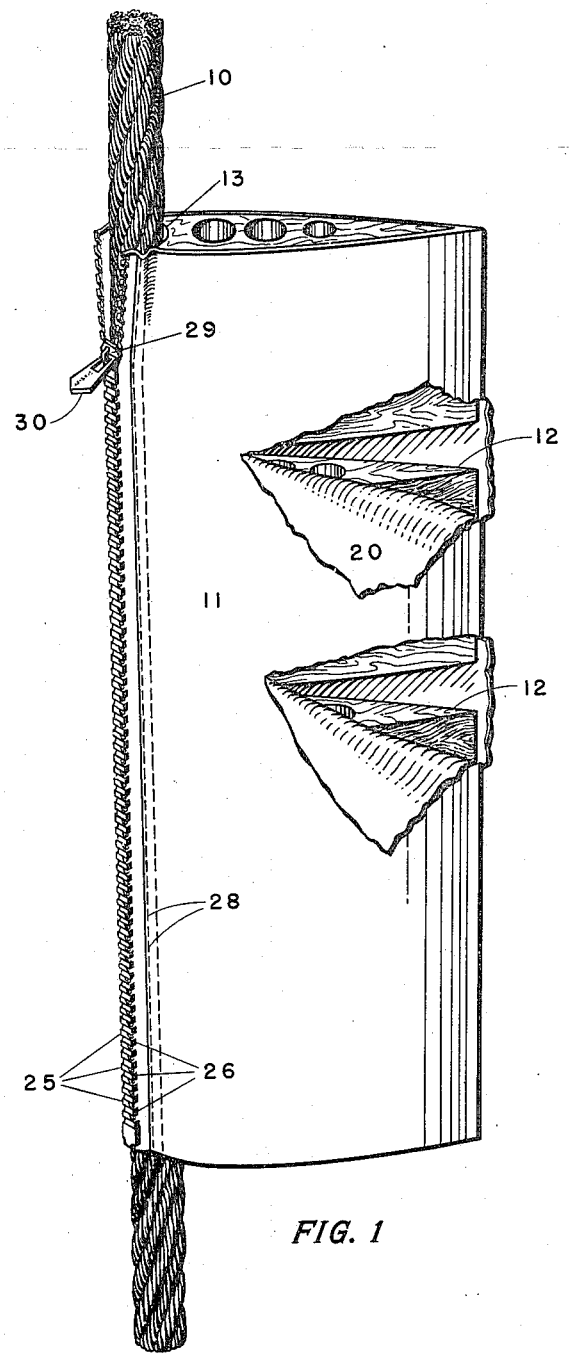
Figure 1 is an elevation of one form of the fairing of the invention, with portions of the surface skin turned back to show the interior structure, the fairing being partially secured in place on a cable.
Figure 2:
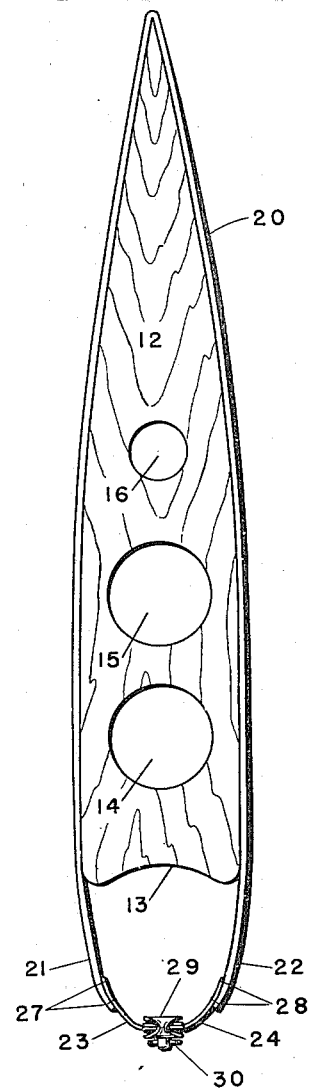
Figure 2 is a plan view of a fairing unit.

Referring to the drawing, and especially to Figure 1, 10 is a cylindrical cable of ordinary construction. Mounted thereon, in accordance with my invention, is a fairing unit 11.

It has been found desirable to make the fairing units about fifteen feet in length; but it should be understood that the invention will operate satisfactorily whether the units be only a few inches long, or of a length much greater than fifteen feet. For convenience, a relatively short length is shown in Figure 1.

The structure of the fairing can readily be seen in the drawing. Each unit comprises one or more blocks 12, which may be formed of wood (as shown) or any other convenient material. The blocks are substantially of streamlined form, except that at the forward end thereof they are cut off short. Preferably, the forward end of each is provided, with a rearwardly curved face 13. Holes, as 14, 15, and 16, extend vertically through the blocks.

A plurality of these blocks, all facing in the same direction, are arranged top to bottom, with a convenient distance between them—the number of blocks depending upon the desired total length of the finished unit—and a flexible cover 20 is secured to them. This cover is of such proportions that it will extend the length of the finished section, and from the trailing edges of the blocks 12 forward beyond the ends 13 of the blocks.

The forward edges, 21 and 22, of the cover are provided with means for holding the same together. As shown, two tapes 23 and 24, with fastener elements 25 and 26, respectively, are secured to the edges of the cover, tape 23 to edge 21, and tape 24 to edge 22. The tapes may be sewed in place, as indicated by the stitching 27, 28; or they may be vulcanized, cemented or fixed in other desirable manner to the edges of the cover. A sliding member 29, provided with a handle 30, is adapted to lock the fastener elements together.

As may readily be seen from Figure 1, the fairing is put in place by securing the forward edges 21, 22 of the flexible cover 20 about the cable. The proportions of the parts should be so determined that after the said edges are fastened together, the fairing swivels easily on the cable. Such looseness or play enables the fairing to adapt itself readily to a change in the direction of movement of the cable.

Certain advantages result from forming the body members or blocks 12 of rubber or some other material the specific gravity of which approximates that of water. When this is the case, the only force on the fairing while in motion is its resistance to the flow, and this resistance is small due to its streamlined form. Other desirable effects, however, are not dependent upon the material of which the blocks are made.

It will be understood that for ordinary operations, the entire length of a towed cable should be faired, and this is accomplished through the use of a plurality of fairing units. The lowermost unit rests against a stop of any convenient type. Each succeeding unit rests on the one below it. In operation, due to the curvature of a towed cable, the units will commonly contact only at and near the cable, and will separate somewhat rearwardly.

The forward ends of the blocks 12 are curved or hollowed out, as at 13, to increase the clearance of the fairing about the cable, while permitting the outside edges of the blocks to extend as far forwardly as possible, thereby to support the nose or leading edge of the fairing. Under some conditions, this nose portion may become distorted if not supported.

Many towing operations require the use of electrical equipment. Since the fairing must swivel on the cable, leads cannot well be carried along the cable itself. It is for this reason that the openings 14, 15 and 16 are provided in the blocks 12, these openings being adapted to have wires passed therethrough.

It will be seen that each fairing unit can swivel freely about the cable in response to changes in the direction of motion of the cable. It will be apparent, also, that each individual block 12 likewise can swivel about the cable. This latter action is somewhat inhibited, but is not prevented, by the flexible cover 20, which may be formed of rubber or canvas.

As stated earlier, the invention is intended to reduce the fluid resistance of a cable or other body. It is obvious, therefore, that its usefulness is not confined to marine work, but extends to other fields, as aeronautics, for example, where it will find application in towing and refueling operations, etc.

The above description is in specific terms. It is to be understood, however, that the invention is not limited to the structure shown and described, but includes the modifications that fall properly within the scope of the appended claims.

The invention herein described may be manufactured and used by or for the Government of the United States of America without the payment of any royalty thereon or therefor.

I claim:

1. A fairing for a cable or the like comprising a plurality of cable-wise normally aligned tail portions, and flexible means covering said tail portions and normally securing them in spaced relation each to the others and forming a head portion for embracing the cable with an easy fit, whereby to permit the fairing and to a limited extent the separate tail portions to swivel with respect to the cable.

2. A fairing for a cable or the like comprising a plurality of tail portions arranged cable-wise in normally aligned relation, flexible means covering said tail portions and permitting limited relative movement therebetween and adapted to surround the cable and pivotally secure the fairing thereto for movement relative to the cable.

3. A fairing for a cable or the like comprising a plurality of cable-wise normally aligned tail portions, a cover flexibly connecting the tail portions for limited relative movement and having forwardly extending marginal side flaps, and releasable securing means on the flaps.

HUGH B. FREEMAN.